July 20, 1965 A. STEINER 3,195,910
STAIR-CLIMBING VEHICLE
Filed Feb. 12, 1964 3 Sheets-Sheet 1

Alois Steiner
INVENTOR.

BY

July 20, 1965 A. STEINER 3,195,910
STAIR-CLIMBING VEHICLE
Filed Feb. 12, 1964 3 Sheets-Sheet 2
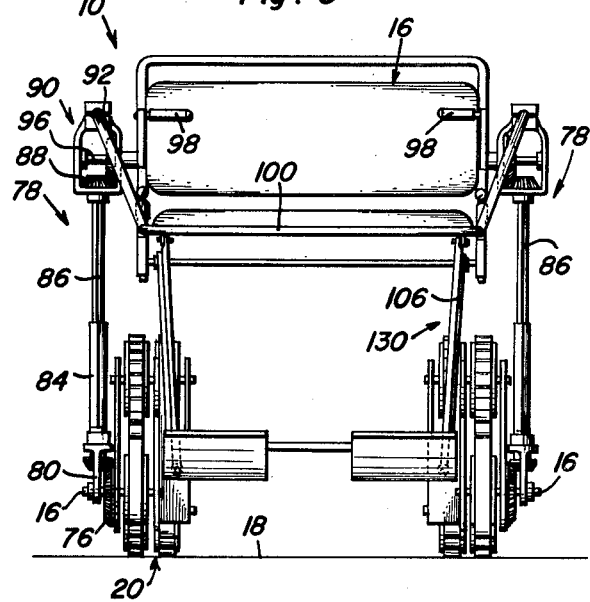
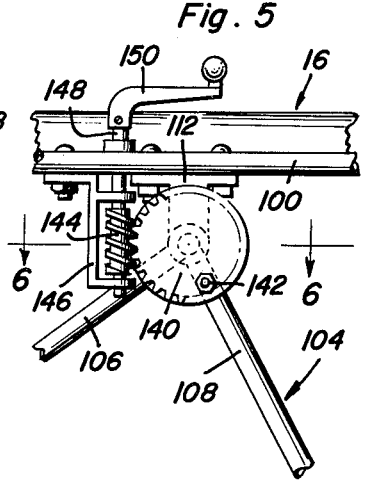
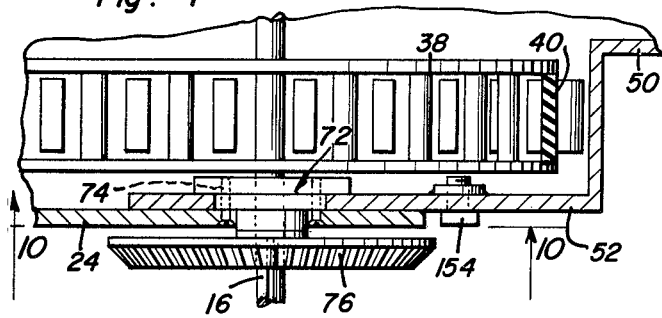
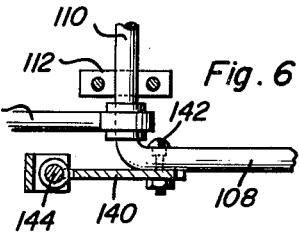
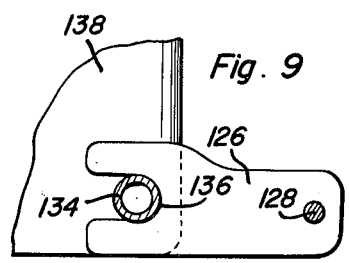
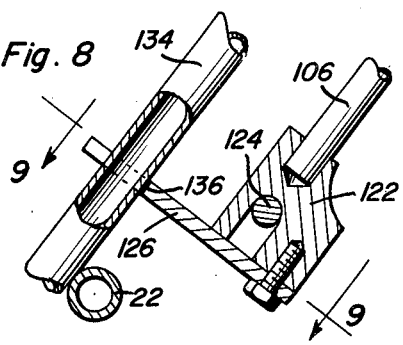
Alois Steiner
INVENTOR.
BY
Attorneys

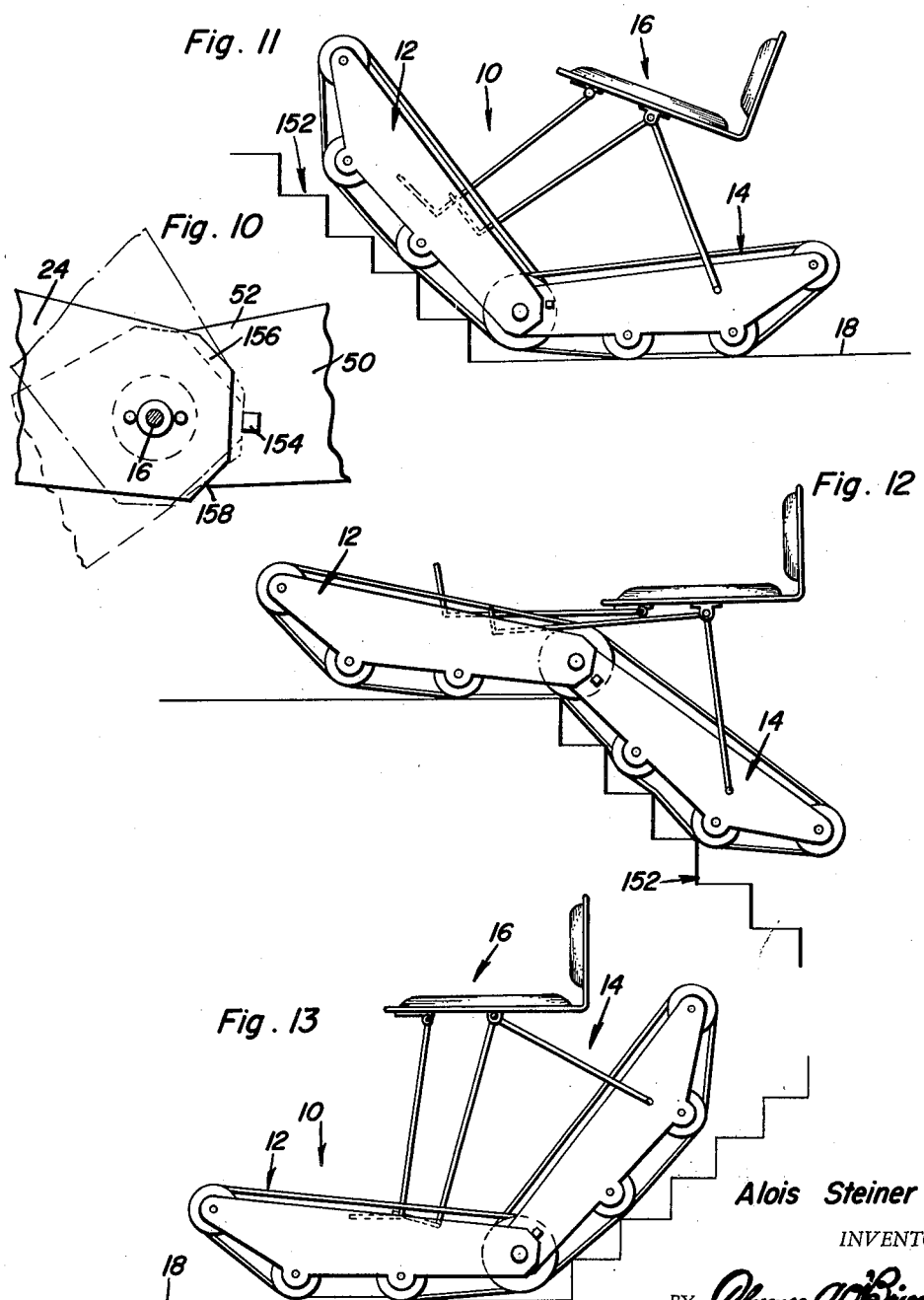

United States Patent Office 3,195,910
Patented July 20, 1965

3,195,910
STAIR-CLIMBING VEHICLE
Alois Steiner, 408 43rd St., Union City, N.J.
Filed Feb. 12, 1964, Ser. No. 344,496
9 Claims. (Cl. 280—5.22)

This invention relates to an occupant controlled vehicle of the type particularly useful for providing transportation for invalids.

The vehicle of the present invention is especially unique because of the ease with which it may be controlled and propelled as well as its ability to climb or descend obstructions such as stairways without any loss of traction.

It is therefore a primary object of the present invention to provide an occupant controlled vehicle adapted to climb stairways while providing for the comfort of the occupant.

An additional object of the present invention is to provide a stair-climbing vehicle which is highly maneuverable and capable of being controlled with ease.

In accordance with the foregoing objects, the vehicle of the present invention is highly maneuverable while being propelled over level ground by a traction belt arrangement. The vehicle is operative in response to engagement of an obstruction to transfer the traction support for the vehicle in such a manner as to enable the vehicle to climb and descend the obstruction without any abrupt loss of traction.

A still further object of the present invention is to provide a stair-climbing vehicle having adjustment facilities for maintaining the occupant seating in a level position and providing a novel footrest arrangement for properly positioning the occupant's feet under all operative conditions of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a front elevational view of the vehicle illustrated in FIGURES 1 and 2.

FIGURE 4 is an enlarged partial sectional view taken substantially through a plane indicated by section line 4—4 in FIGURE 1.

FIGURE 5 is an enlarged partial side elevational view of a portion of the vehicle illustrated in FIGURE 1.

FIGURE 6 is a partial sectional view taken substantially through a plane indicated by section line 6—6 in FIGURE 5.

FIGURE 8 is an enlarged partial sectional view taken substantially through a plane indicated by section line 8—8 in FIGURE 2.

FIGURE 9 is a partial sectional view taken substantially through a plane indicated by section line 9—9 in FIGURE 8.

FIGURE 10 is a partial sectional view taken substantially through a plane indicated by section line 10—10 in FIGURE 4.

FIGURES 11–13 are simplified side elevational views of the vehicle shown in various operative positions thereof.

Figure 1:
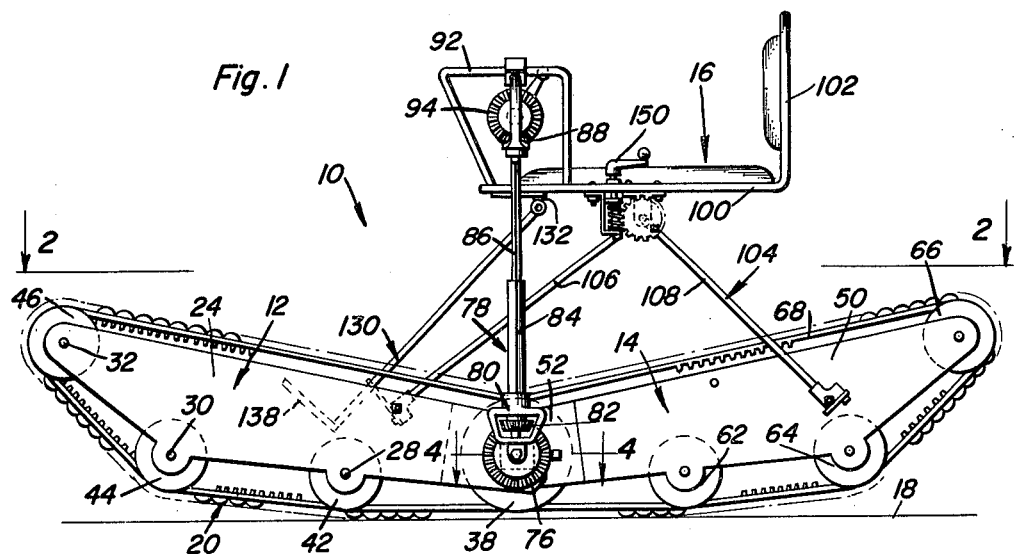
FIGURE 1 is a side elevational view of the vehicle of the present invention.
Figure 2:
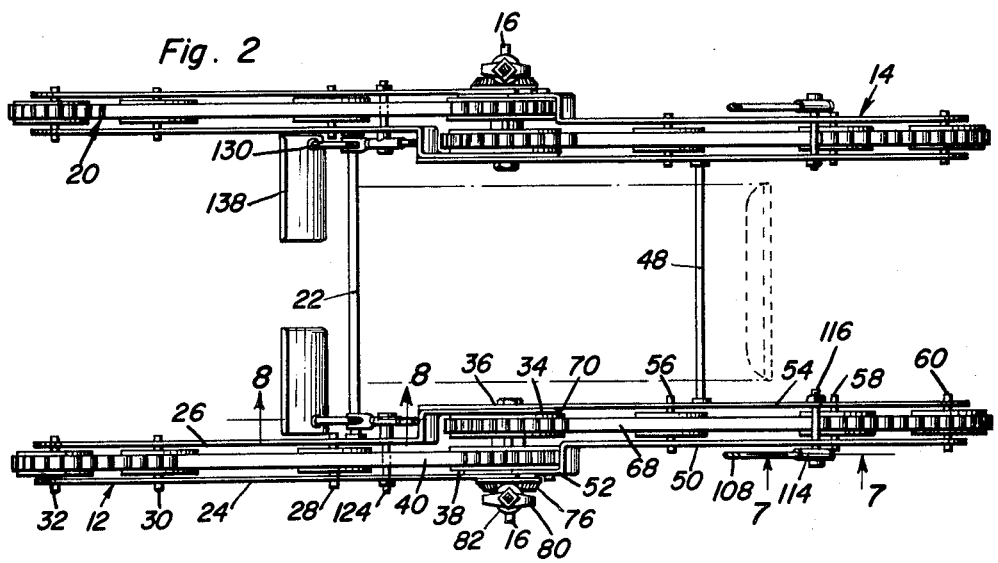
FIGURE 2 is a top view of the vehicle taken substantially through a plane indicated by section line 2—2 in FIGURE 1.

Referring now to the drawings in detail, it will be observed from FIGURES 1, 2 and 3 that the vehicle generally referred to by reference numeral 10 involves two pivotally interconnected frame sections consisting of a forward frame section 12 and a rear frame section 14. The frame sections are pivotally interconnected about an axis extending through a pair of axle members 16, the forward frame section 12 extending forwardly therefrom and the rear frame section 14 extending rearwardly therefrom in spaced relation above the ground 18 over which the vehicle is propelled by traction means generally referred to by reference numeral 20.

The forward frame section 12 consists of a pair of laterally spaced frame assemblies interconnected by a spacer rod 22. Each frame assembly of the forward frame section includes an outer elongated plate member 24 closely spaced from a parallel elongated plate member 26 to which the spacing rod 22 is connected. The plate members 24 and 26 are interconnected in parallel spaced relation to each other by a plurality of wheel mounting shafts 28, 30 and 32 as well as by the aforementioned axle 16. The inner plate member 26 is provided with a laterally offset end portion 34 through which the axle 16 extends and against which the head 36 connected to the axle abuts. Connected to the axle 16 and located between the laterally offset portion 34 of the plate member 26 and the end portion of the plate member 24, is a central propelling wheel member 38 about which an endless traction belt 40 of the traction means 20 is entrained. The traction belt 40 is also entrained about a pair of ground-supporting propelling wheels 42 and 44 rotatably mounted by the shafts 28 and 30. The traction belt therefore extends from the central wheel 38 to the wheel 42 in ground-engaging relation to level ground 18 and from wheel 42 extends upwardly at a slight angle for entrainment about the other forward wheel 44 displaceable into traction supporting relation to the frame section 12. The traction belt then extends upwardly from the wheel 44 about the return idler wheel 46 from which the upper run of the belt is returned to the central wheel 38. Thus, two separate traction belts 40 are mounted by the forward frame section for both propelling and steering the vehicle 10.

The rear frame section 14 also includes a pair of frame assemblies interconnected by a spacing rod 48. Each frame assembly of the rear frame section includes an outer elongated plate member 50 having a substantially similar configuration as the outer plate member 24 of the forward frame section except that the plate member 50 is provided with a laterally offset end portion 52 which overlaps the end portion of the plate member 24. The axle member 16 therefore extends through the laterally offset end portion 52 of the outer plate member 50 and through the overlapping end portion of the inner plate member 54 disposed in close spaced parallel relation to the outer plate member 50. The plate members 50 and 54 are interconnected in spaced relation to each other in a smilar fashion as the plate members of the forward section by wheel shafts 56, 58 and 60. Th wheel shafts therefore also rotatably mount between the plate members 50 and 54, ground-supporting wheels 62 and 64 as well as the return idler wheel 66. An endless traction belt 68 is therefore entrained about the wheels 62, 64 and 66 and about a second central wheel 70 axially spaced from the wheel 38 between the end portions 34 and 52 of the plate members 26 and 50 respectively. Accordingly, a pair of traction belts 68 are associated with the rear frame section 14, the inner plate members 54 of which are interconnected by the spacing rod 48 so as to also propel and steer the vehicle.

The axle members 16 are rotatably mounted by journal assemblies 72 mounted by fasteners 74 within aligned openings in the overlapping portions of the plate members 24 and 50, as more clearly seen in FIGURE 4. The axially spaced central wheels 38 and 70 fixed to each axle 16 are therefore driven through the bevel gears 76 fixed to the projecting portions of the axles on the outside of the plate members 24 in order to impart movement to both sets of traction belts 40 and 68 in order to propel the vehicle. The bevel gear 76 therefore forms part of a drive assembly generally referred to by reference numeral 78 including a gear frame member 80 pivotally mounted on each drive axle and rotatably mounting a bevel pinion 82 in mesh with the bevel gear 76. The bevel pinion 82 is fixed to a tubular shaft 84 having a non-circular cross section slidably receiving the drive shaft 86 which extends upwardly on each side of the vehicle for connection to bevel gears 88. The bevel gears 88 are rotatably mounted within gear frame assemblies 90 fixed to the forward side portions of the seat assembly 91 by the connecting frame portions 92. Each bevel gear 88 is therefore in mesh with a bevel gear 94 rotatably mounted within the gear frame assemblies 90 by drive shafts 96 to which the handles 98 are connected. It will therefore be apparent, that the vehicle occupant seated in the seat assembly 91 may grasp the handles 98 in order to impart rotation to the bevel gears 94 operative through the drive assemblies 78 to impart rotation to the central wheels 38 and 70 and the traction belts 40 and 68 entrained thereabout. The vehicle may thereby be propelled in either a forward or reverse direction along a straight line when both handles are driven at the same speed. By driving the gears at different speeds or holding one set of gears stationary, the vehicle may be steered in any direction.

Figure 7:
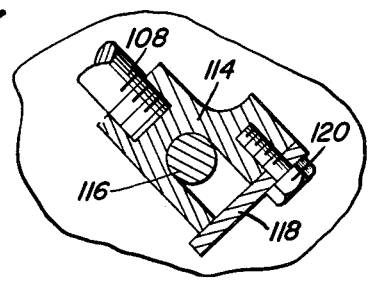
FIGURE 7 is an enlarged partial sectional view taken substantially through a plane indicated by section line 7—7 in FIGURE 2.

The slidable connection established by the tubular shaft 84 and shaft 86 in the drive assemblies 78, is necessary in view of variations in the height of the seat assembly 91 above the drive axles 16. Also, pivotal mounting of the gear frames 80 on the drive axles will accommodate angular displacement of the upper end of the drive assemblies 78 because of angular displacement of the seat assembly relative to the drive axles. The seat assembly is therefore provided with a generally horizontal frame portion 100 on which the connecting frame portions 92 are mounted and a vertical brackrest frame portion 102. The horizontal frame portion 100 of the seat assembly is therefore supported vertically spaced above and between the drive axles 16 by a supporting frame member 104 and a pair of connecting link members 106. The supporting frame member 104 includes a pair of parallel spaced tubular portions 108 interconnected at upper ends by a horizontal portion 110 as more clearly seen in FIGURE 6 so as to establish a supporting axis about which the seat assembly is mounted. Accordingly, spaced brackets 112 are secured to the horizontal frame portion 100 of the seat assembly and project therebelow for receiving the horizontal portion 110 of the supporting frame member 104. The lower ends of the parallel spaced portions 108 of the frame member 104, as more clearly seen in FIGURE 7, are secured to bracket members 114 which receive the shank of connecting bolt assemblies 116 extending between the spaced plate members 50 and 54. The bracket members 114 are held assembled on the shank of the bolt assemblies 116 by plate elements 118 secured by the fasteners 120 to the bracket members 114. The supporting frame member 104 is thereby pivotally connected to the rear frame section 14 in order to space the supporting axis for the seat assembly above the frame sections. The supporting axis is held therefore in spaced relation above the frame sections by the connecting link members 106 pivotally connected to the horizontal portion 110 of the supporting frame member 104, as more clearly seen in FIGURES 5 and 6. The lower ends of the connecting link members 106 are therefore provided with bracket members 122, as more clearly seen in FIGURE 8, so as to receive the shank portions of axially aligned bolt assemblies 124 which extend through the plate members 24 and 26 of the forward frame section 12. The bolt assemblies 124 are held assembled within the bracket members 122 by elongated plate elements 126 secured to the bracket members by the fasteners 128. The plate elements 126 also serve an additional function in forming an abutment for a pair of footrest assemblies 130 pivotally mounted by pivot brackets 132 below the forward end portion of the horizontal frame portion 100 of the seat assembly. Accordingly, each footrest assembly includes a pivotally suspended rod or pipe 134 received within the slot 136 of the plate element 126 in order to position the footrest element 138 forwardly of the seat assembly between the laterally spaced frame assemblies of the forward frame section to receive the occupant's feet, as more clearly seen in FIGURES 1 and 9.

In order to angularly fix the seat assembly in an adjusted position about the supporting axis extending through the horizontal portion 110 of the supporting frame 104, a gear member 140 is fixed to one of the side portions 108 of the frame member by the fastener assembly 142, as more clearly seen in FIGURES 5 and 6. A locking worm gear 144 is held in mesh with the gear member 140 and is rotatably mounted by a bracket member 146 secured to the horizontal frame portion 100 of the seat assembly. The worm gear 144 is therefore connected to a shaft 148 projecting upwardly from the bracket 146 to which an adjustment handle 150 is connected in position for manipulation by the vehicle occupant. It will therefore be apparent, that the worm gear 144 meshing with the gear 140 will lock the seat frame in angular position relative to the supporting frame 104 in order to angularly fix the seat assembly about the supporting axis extending through the horizontal portion 110 of the supporting frame 104. In order to change this angular relationship, the adjustment handle 150 is rotated. It will therefore be apparent, that the angular position of the seat assembly may be adjusted by the vehicle occupant in order to restore its level position when the forward and rear frame sections are angularly displaced about the axis established through the axles 16.

When the vehicle is being propelled along level ground, the forward and rear frame sections 12 and 14 will assume an angular position illustrated in FIGURE 1 wherein the vehicle is supported between the central wheels 38, 70 and the ground-supporting wheels 42 and 62 associated with the forward and rear frame sections respectively. Accordingly, both frame sections of the vehicle are propelled by portions of the traction belts 40 and 68 extending from the central wheels to the wheels 42 and 62 in order to establish a minimum amount of belt traction with level ground. Therefore, over level ground the vehicle will be supported on the drive axles 16 and will be easily maneuvered as well as driven. When the vehicle is driven forwardly and encounters an obstruction such as the stairway 152 as illustrated in FIGURE 11, the forward frame section 12 will be pivotally displaced upwardly. This pivotal displacement of the forward frame section causes rearward tilting of the seat assembly and also transfers ground-supporting load to the rear frame section 14 by bringing the rearmost ground-engaging wheels 64 into ground engagement. Accordingly, the traction lost by the traction belts in the forward frame section when encountering the obstruction, will be compensated for by extension of the traction belts of the rear section into ground engagement with an increase in resistance to movement since the central drive wheels are no longer loaded. Also, by manipulation of the adjustment handle 150 the level position of the seat assembly may be re-established as aforementioned. The vehicle may then proceed or climb the stairway 152 at an upward incline. While climbing the stairway, all portions of the traction belts between the wheels 62 and 64 will be as shown in FIGURES 11 in order to provide the maximum traction possible for the rear frame section 14 to which the propelling force has been transferred. At the top of the stairway illustrated in FIGURE 12, maximum traction is then established for the forward frame section 12 as traction from the rear frame section is diminished.

Similarly, when descending a stairway as illustrated in FIGURE 13, maximum traction for the forward frame section is established when traction of the rear frame section is diminished during transition from the stairway to level ground. This ability of the vehicle to redistribute its traction and support when encountering an obstruction or any deviation from level ground is especially important when transporting invalids. For example when descending a stairway the extended traction of the rear section 14 induced by initial downward movement of the forward section 12 will establish holding power and control for the vehicle to eliminate any sinking sensation for the occupant. However, only when traveling over level ground will minimum traction of each frame section be established as aforementioned. It will be apparent then, that relative angular displacement between the forward and rear frame sections automatically occurs when encountering obstructions, so as to advantageously transfer load support between the frame sections and change the traction arrangement. However, in order to limit the angular displacement between the frame sections, a limit member 154 is secured to the laterally offset portion 52 of the plate member 50 for abutting the beveled edges 156 or 158 on the end of the plate member 24 when a relative angular limit position is assumed, as more clearly seen in FIGURE 10 wherein the limit positions are shown by dotted line.

From the foregoing description, the construction, operation and utility of the vehicle of the present invention will be apparent. It will therefore be appreciated, that the ability of the vehicle to automatically accommodate itself to different situations and obstructions renders the vehicle more easily controlled and maneuverable under all situations. In view of the ease with which the vehicle may be propelled and steered or maneuvered, manual operation is possible for driving, steering and seat leveling adjustment as described. It will however be apparent that power operated facilities could be provided for driving, steering and adjusting seat level. For example, separate electric motors could be utilized in place of the handles 98 with variable speed electric controls enabling the vehicle occupant to both control the speed of the vehicle and effect steering by driving. Similarly, switch controls may be provided for electrically operating the seat level adjustment by providing an electric motor in place of the adjustment handle 150. Automatic level-sensing facilities may also be provided in connection with such adjustment controls so as to automatically maintain the seat in a level position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an occupant-controlled obstruction climbing vehicle, a drive axle, a pair of frame sections respectively extending forwardly and rearwardly from the drive axle, traction means operatively connected to the drive axle for propelling the frame sections along the ground, means pivotally mounting said pair of frame sections on the drive axle, and means mounting the traction means on the drive axle and the frame sections for redistributing the propelling force in response to angular displacement of one of the frame sections by an obstruction to increase the traction along the other of said frame sections, said traction mounting means including a pair of spaced ground supporting wheel assemblies rotatably mounted by each frame section, load supporting wheel means connected to said drive axle in alignment between one of said wheel assemblies of each frame section for support of the vehicle on level ground, the pair of wheel assemblies on one of the frame sections supporting the vehicle on the ground when the other frame section is angularly displaced by said obstruction engaging the traction means.

2. The combination of claim 1, including occupant supporting means for loading the vehicle, link means pivotally interconnecting said occupant supporting means with said frame sections for support of the occupant supporting means in spaced relation above the drive axle, and selectively operable adjustment means for holding the occupant supporting means in an adjustably fixed angular relation to the link means.

3. The combination of claim 2, including drive means operatively mounted between the occupant supporting means and the drive axle for imparting movement to the drive axle and the traction means.

4. In an occupant controlled obstruction climbing vehicle, a drive axle, a pair of frame sections respectively extending forwardly and rearwardly from the drive axle, traction means for imparting propelling force to the frame sections, means pivotally mounting said pair of frame sections on the drive axle for angular displacement of said frame sections relative to each other in response to engagement of an obstruction by the traction means, means mounting the traction means on the drive axle and the frame sections for redistributing propelling force therebetween in response to said relative displacement between the frame sections, seat means for loading the vehicle, link means pivotally interconnecting said seat means with said frame sections, means limiting said relative angular displacement of the frame sections for controlling the redistribution of the propelling force between the frame sections, and selectively operable leveling means for holding the seat means in adjustably fixed angular relation to the link means.

5. The combination of claim 4, wherein said link means comprises, a supporting member pivotally connected to one of said frame sections for establishing a pivotal adjustment axis about which the seat means is mounted, a connecting member pivotally connected between the other frame section and the supporting member, said adjustment means including adjustment gear means fixed to said supporting member and locking gear means mounted by the seat means in meshing engagement with the adjustment gear means.

6. The combination of claim 5 including foot rest means pivotally mounted by the seat means for suspension therebelow, and abutment means mounted by said connecting member for engaging the foot rest means in a position extending forwardly from the seat means.

7. The combination of claim 4 including foot rest means pivotally mounted by the seat means for suspension therebelow, and abutment means mounted by said link means for engaging the foot rest means in a position extending forwardly from the seat means.

8. An occupant controlled climbing vehicle comprising, a pair of frame sections, means pivotally interconnecting said frame sections, spaced supporting wheel means mounted by each frame section, central wheel means mounted by the pivotal interconnecting means between said frame sections in supporting relation thereto on level ground, endless traction means mounted by said supporting wheel means and entrained about said central wheel means for propelling the vehicle, an occupant support seat, means mounted between said frame sections and connected to said seat about a supporting axis displaceable in response to pivotal movement of one frame section relative to the other, leveling means mounted on the seat for locking the seat in an adjusted angular position relative to said supporting axis, and drive means operatively connected to one of said wheel means for imparting movement to the traction means to propel the vehicle, said traction means including belts extended into ground engagement along one of the frame sections upon relative pivotal movement of the other frame section in response to engagement of an obstruction by the traction means.

9. In an obstruction climbing vehicle, a pair of frames, a pair of supporting wheels mounted by each frame, means pivotally interconnecting the frames for support of each frame by one of the wheels of each of said pair of supporting wheels, a drive wheel mounted by said pivotal interconnecting means in supporting relation to both of said frames when respectively supported by said one of the supporting wheels, occupant supporting means operatively mounted by said frames for displacing one of said frames to a position supported solely by the pair of supporting wheels associated therewith in response to engagement of the other of the frames by an obstruction causing the drive wheel and the supporting wheels of the other frame to be displaced from supporting relation to the vehicle, and traction belt means drivingly connecting the drive wheel with the respective pairs of supporting wheels for locational redistribution of propelling force between said frames in response to pivotal displacement about the pivotal interconnecting means when engaging the obstruction.

References Cited by the Examiner

UNITED STATES PATENTS

| | | | |
|---|---|---|---|
| 2,751,027 | 6/56 | McLaughlin | 280—5.22 X |
| 3,127,188 | 3/64 | Greub | 280—5.22 |

FOREIGN PATENTS

| | | |
|---|---|---|
| 541,253 | 11/41 | Great Britain. |
| 589,004 | 6/47 | Great Britain. |

ARTHUR L. LA POINT, *Primary Examiner.*